(12) United States Patent
Kutomi

(10) Patent No.: US 9,127,954 B2
(45) Date of Patent: Sep. 8, 2015

(54) NAVIGATION SYSTEM, NAVIGATION APPARATUS, AND DATA CENTER

(75) Inventor: Shinji Kutomi, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/599,054

(22) Filed: Aug. 30, 2012

(65) Prior Publication Data
US 2013/0080054 A1 Mar. 28, 2013

(30) Foreign Application Priority Data
Sep. 26, 2011 (JP) .................. 2011-209361

(51) Int. Cl.
G01C 21/34 (2006.01)
G01C 21/32 (2006.01)
G08G 1/0969 (2006.01)
G09B 29/10 (2006.01)

(52) U.S. Cl.
CPC .............. *G01C 21/32* (2013.01); *G08G 1/0969* (2013.01); *G09B 29/106* (2013.01)

(58) Field of Classification Search
None
See application file for complete search history.

(56) References Cited

U.S. PATENT DOCUMENTS

| | | | |
|---|---|---|---|
| 6,484,093 B1 | 11/2002 | Ito et al. | |
| 6,597,906 B1 * | 7/2003 | Van Leeuwen et al. | 455/422.1 |
| 8,160,616 B2 * | 4/2012 | Jain et al. | 455/456.3 |
| 2003/0045997 A1 | 3/2003 | Nakane et al. | |
| 2003/0144792 A1 | 7/2003 | Amano et al. | |
| 2006/0173614 A1 | 8/2006 | Nomura | |
| 2008/0027636 A1 * | 1/2008 | Tengler et al. | 701/209 |
| 2008/0051992 A1 | 2/2008 | Yamada | |
| 2011/0282575 A1 * | 11/2011 | Masuda et al. | 701/201 |

FOREIGN PATENT DOCUMENTS

| | | |
|---|---|---|
| JP | A-2003-75163 | 3/2003 |
| JP | 2003-172627 A | 6/2003 |
| JP | 2006-258669 A | 9/2006 |

OTHER PUBLICATIONS

Office Action mailed Aug. 6, 2013 issued in corresponding JP patent application No. 2011-209361 (and English translation).
Office Action mailed Mar. 11, 2014 issued in corresponding JP patent application No. 2011-209361 (and English translation).
First Office Action mailed Dec. 22, 2014 in corresponding CN patent application No. 201210359953.8 (and English translation).

* cited by examiner

*Primary Examiner* — Thomas Tarcza
*Assistant Examiner* — Garrett Evans
(74) *Attorney, Agent, or Firm* — Posz Law Group, PLC

(57) ABSTRACT

A navigation system includes a navigation apparatus, a data center, a communication-defective region acquisition device, a communication-defective region search device, and a target region specify device. The data center performs transmits an update data of a target region to the navigation apparatus. The communication-defective region acquisition device acquires information of a communication-defective region. The communication-defective region search device searches for a part of the communication-defective region as a target communication-defective region, which includes a route scheduled to go through. The target region specify device specifies the target region based on the target communication-defective region. The data center includes an update data transmission device that transmits the update data of the target region to the navigation apparatus before the navigation apparatus enters the target communication-defective region.

16 Claims, 11 Drawing Sheets

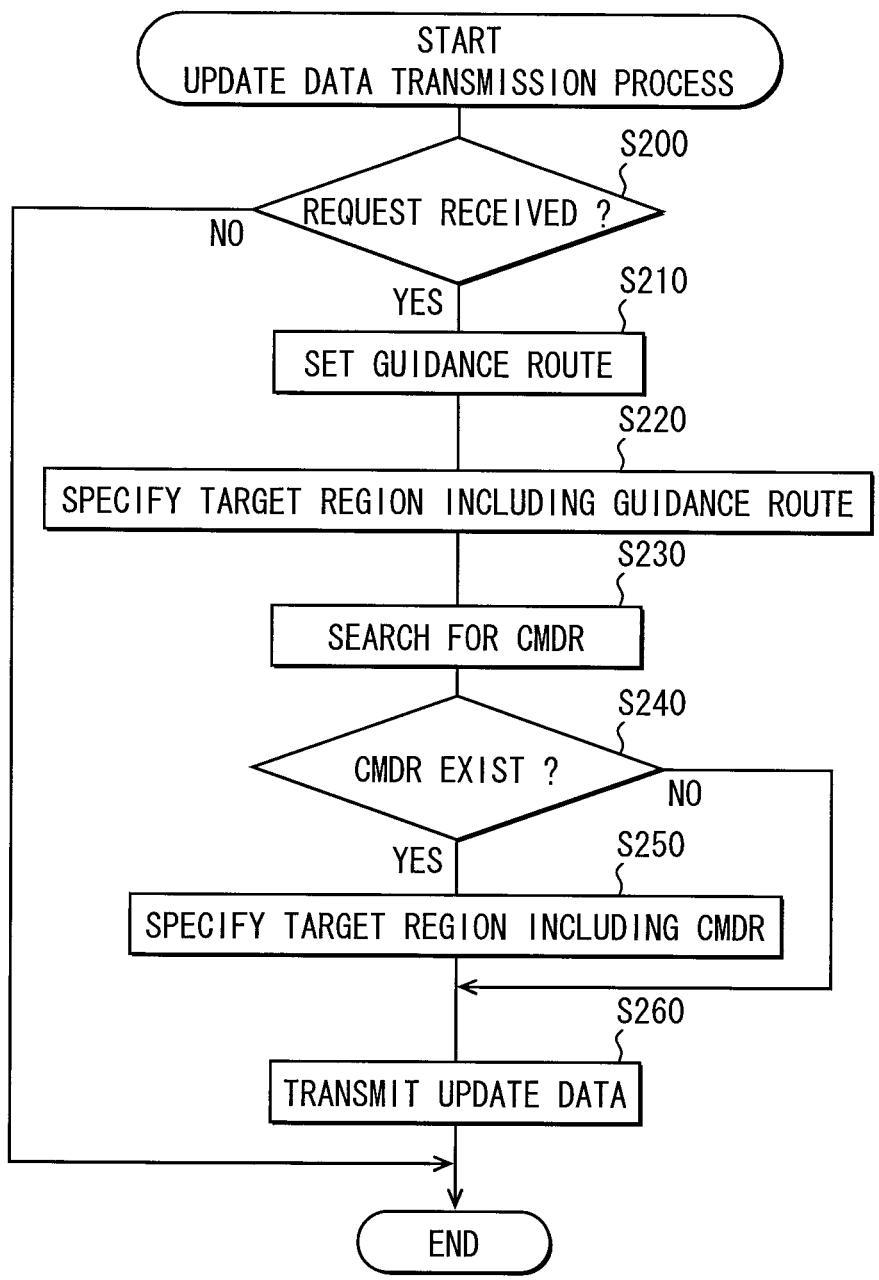

NAVIGATION SYSTEM, NAVIGATION APPARATUS, AND DATA CENTER

CROSS REFERENCE TO RELATED APPLICATION

This application is based on Japanese Patent Application No. 2011-209361 filed on Sep. 26, 2011, the disclosure of which is incorporated herein by reference.

TECHNICAL FIELD

The present disclosure relates to a navigation apparatus, a data center, and a navigation system including the navigation apparatus, which performs a route guidance, and the data center, which performs a data communication with the navigation apparatus.

BACKGROUND

Conventionally, in order to increase a precision of route guidance of a navigation apparatus, the navigation apparatus updates map data by performing a data communication with a data center. Recently, the navigation apparatus can partially update map data in order to update only a part of the map data, which has been changed.

The map data is indicative of a map of an area. The map data is divided into one or more predetermined segment data elements, which are indicative of one or more predetermined segments included in the map of the area. Hereinafter, the predetermined segment is also referred to as a mesh, and the predetermined segment data element is also referred to as a mesh data element. When updating the map data by the data communication between the navigation apparatus and the data center, update data of the segments, which is to be updated, is transmitted from the data center to the navigation apparatus in units of a mesh data element, that is, per mesh data element. Hereinafter, a segment, whose segment data element is to be updated, is also referred to as a target segment or a target mesh, and the segment data element is also referred to as a target segment data element or a target mesh data element. Thus, when the number of the target segment data elements increases, amount of the update data of the target segments increases. Accordingly, a time period for obtaining the update data increases, and communication fee increases.

Regarding the foregoing difficulties, various technologies for partially updating the segment data elements according to a need of a user are disclosed, for example, in JP-4409431-B2 (corresponding to US 2006/0173614 A1), JP-4603735-B2 (corresponding to US 2003/0045997 A1), JP-3871311-B2 (corresponding to US 2003/0144792 A1), and JP-2003-75163-A. For example, in JP-4409431-B2 (corresponding to US 2006/0173614 A1), update data of only the target segments, which include a guidance route to a destination set by a user, is transmitted from the data center.

In a conventional technology, when a communication-disabled region, where the data communication is disabled, is included in the target segments, a further route guidance is not available after entering the communication-disabled region included in the target segments.

SUMMARY

In view of the foregoing difficulties, it is a first object of the present disclosure to provide a navigation system, which updates map data in order to provide a proper guidance when a communication-disabled region or a region having a poor communication quality exists around a road, which is likely to be used by a user. It is a second object of the present disclosure to provide a navigation apparatus, which provides a proper guidance. It is a third object of the present disclosure to provide a data center, which performs a data communication with the navigation apparatus.

According to a first aspect of the present disclosure a navigation system a navigation system includes a navigation apparatus, a data center, a communication-defective region acquisition device, a communication-defective region search device, and a target region specify device. The navigation apparatus performs a route guidance and stores map data including a plurality of segment data elements. The map data is indicative of a map of an area, and each of the plurality of segment data elements is indicative of a corresponding segment included in the area. The data center performs a data communication with the navigation apparatus to transmit an update data of a target region, which is included in the area, to the navigation apparatus. The target region includes one or more target segments whose segment data elements are to be updated by the update data. The update data of the target region is transmitted per segment data element. The communication-defective region acquisition device acquires information of a communication-defective region. The communication-defective region is included in the area and is defined as a region where the data communication becomes defective. The communication-defective region search device searches for a part of the communication-defective region as a target communication-defective region, which includes a route scheduled to go through. The target region specify device specifies the target region based on the target communication-defective region. The data center includes an update data transmission device that transmits the update data of the target region to the navigation apparatus before the navigation apparatus enters the target communication-defective region.

In the above system, the transmission device transmits the update data of the target region to the navigation apparatus before the navigation apparatus enters the target communication-defective region. Thus, when a communication-defective region exists around the route scheduled to go through, the map data stored in the navigation apparatus is updated by the update data in order to provide a proper guidance to a user.

According to a second aspect of the present disclosure, a navigation apparatus is defined in the navigation system according to the first aspect.

In the above navigation apparatus, the update data of the target region is received by the navigation apparatus before the navigation apparatus enters the target communication-defective region. Thus, when a communication-defective region exists around the route scheduled to go through, the map data stored in the navigation apparatus is updated by the update data in order to provide a proper guidance to a user.

According to a third aspect of the present disclosure, a data center is defined in the navigation system according to the first aspect.

In the above data center, the update data of the target region is transmitted by the data center to the navigation apparatus before the navigation apparatus enters the target communication-defective region. Thus, when a communication-defective region exists around the route scheduled to go through, the map data stored in the navigation apparatus is updated by the update data in order to provide a proper guidance to a user.

BRIEF DESCRIPTION OF THE DRAWINGS

The above and other objects, features and advantages of the present disclosure will become more apparent from the following detailed description made with reference to the accompanying drawings. In the drawings:

FIG. 3 is a flowchart showing an update data transmission process executed by a data center according to the first embodiment;

DETAILED DESCRIPTION

Before describing embodiments of the present disclosure, a study that is performed by the inventor to arrive at the present disclosure will be described. According to the study by the inventor, in a case where a region around a present destination is a communication-disabled region, a newly created road from the present destination as a new start point to a new destination is not shown to a user when the user further searches for a new guidance route after arrival to the present destination. In this case, since only target segments including a present guidance route from a present start point to the present destination are updated, the new guidance route is not shown to the user, even when the newly created road from the new start point to the new destination exists, caused by a communication disable around the destination.

Figure 11A:
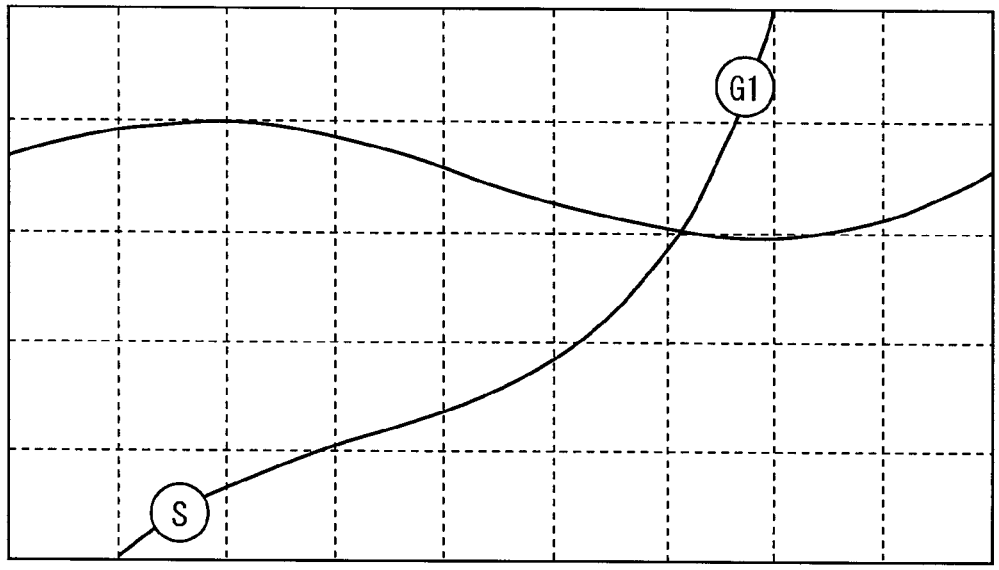
FIG. 11A and FIG. 11B are schematic diagrams showing a difficulty in transmitting update data, which is studied by the inventor of the present disclosure.

As shown in FIG. 11A, in a case where a guidance route R1 from a start point S to a destination G1 is set, update data of target segments including the guidance route R1 from the start point S to the destination G1 is transmitted by the data center. The target segments, which include the guidance route R1, are hatched by slant lines. At the same time, a newly created guidance route R2, which is included in the target segments, is updated and added to the map data. Thus, for example, when a traffic congestion occurs at a position 3, the newly created guidance route R2 may be shown to the user as a bypass route.

Figure 11B:
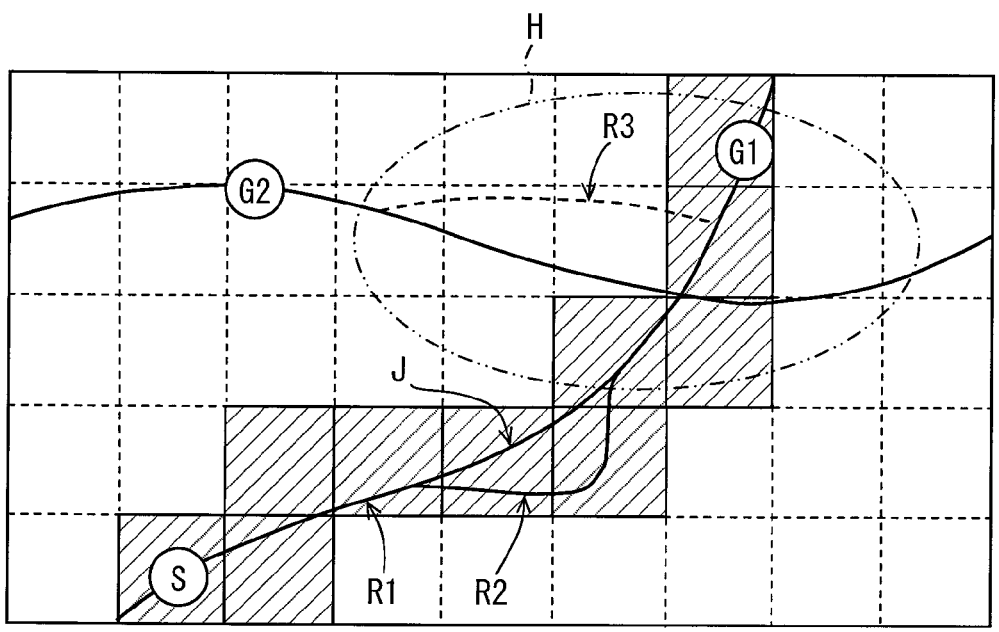

Further, a case where a region around a present destination is a communication-disabled region will be described with reference to FIG. 11B. As shown in FIG. 11B, a region H circled by a two-dot chain line is the communication-disabled region. In this case, when the user arrives at the destination G1 and further searches for a guidance route to the new destination G2 with the present destination G1 as the new start point, the guidance route R3, which is a newly created road shown by a dashed line, is not shown to the user even though the guidance route R3 exists. This is because the target segments, which include a guidance route from the new start point G1 to the new destination G2, cannot be updated caused by a communication disable around the new start point G1.

Further, in a case where the communication-disabled region exists around a road to be used by the user, a newly created road included in the communication-disabled region around the road to be used by the user cannot be updated. Thus, the newly created road around the road to be used by the user is not shown to the user, and further, cannot be used by the user. Further, when a region, which enables a communication but has a poor communication quality, exists around the road to be used by the user, similar to the above-described cases, a newly created road included in the region having the poor communication quality cannot be properly used by the user.

The following will describe embodiments of the present disclosure with reference to the drawings.

First Embodiment

Figure 1:
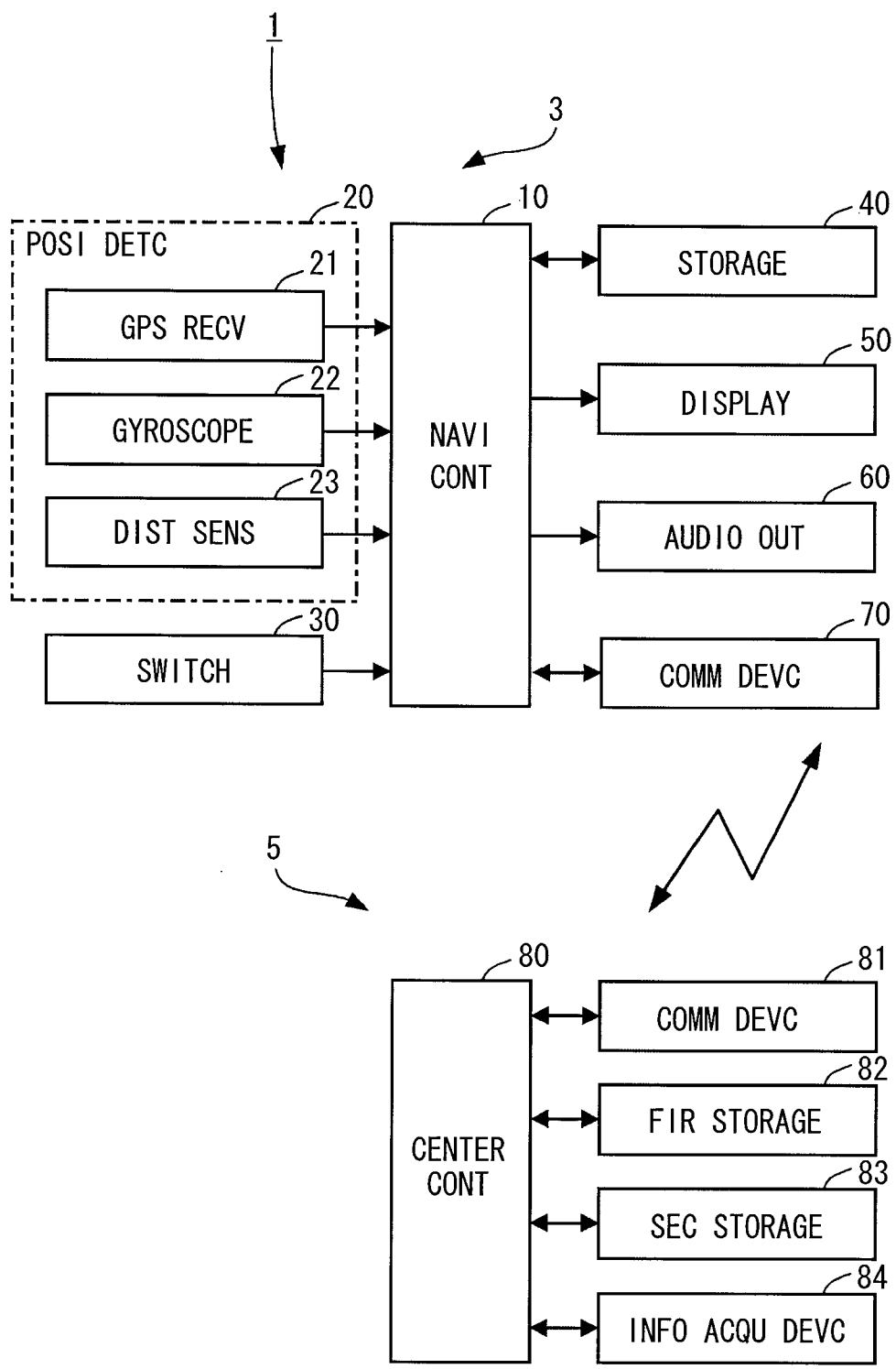
FIG. 1 is a block diagram showing a configuration of a navigation system.

A first embodiment of the present disclosure will be described with reference to FIG. 1 to FIG. 4B. As shown in FIG. 1, a navigation system 1 includes a navigation apparatus 3 and a data center 5.

The navigation apparatus 3 is equipped to a vehicle, and mainly includes a navigation controller (NAVI CONT) 10. The navigation apparatus may be a portable terminal, such as a smart phone having a navigation function, other than a device equipped to a vehicle. The navigation controller 10 mainly includes a well-known microcomputer, which has a central processing unit (CPU), a read only memory (ROM), a random access memory (RAM), an input/output (I/O) interface and a bus line for coupling the CPU, the ROM, the RAM and the I/O interface. The navigation controller 10 further includes a position detector (POSI DETC) 20, a switch group (SWITCH) 30, a storage 40, a display screen (DISPLAY) 50, an audio output device (AUDIO OUT) 60, and a communication device (COMM DEVC) 70. The position detector 20 detects a present position of the vehicle. The switch group 30 is used for inputting a command from a user to the navigation apparatus 3. The storage 40 stores map data. The display screen 50 displays a map and various information to the user. The audio output device 60 guides the user with audio guidance. The communication device 70 of the navigation apparatus 3 communicates with the data center 5.

The position detector 20 receives signals transmitted from satellites for a global positioning system (GPS). The position detector 20 includes a GPS receiver (GPS RECV) 21, a gyroscope (DIST SENS) 22, and a distance sensor (DIST SENS) 23. The GPS receiver 21 detects a position coordinate and an altitude of the present position of the vehicle. The gyroscope 22 outputs a detection signal corresponding to an angular velocity of a rotational motion applied to the vehicle. The distance sensor 23 outputs a traveling distance of the vehicle. The navigation controller 10 calculates the present position, a direction, and a velocity of the vehicle based on signals output from the GPS receiver 21, the gyroscope 22, and the distance sensor 23. Further, the present position may be calculated in various methods based on the output signal from the GPS receiver 21. For example, a single point positioning method or a relative positioning method may be used to calculate the present position of the vehicle.

The switch group 30 includes a touch panel and mechanical key switches. The touch panel is integrally set with the display screen 50 on the display screen. The mechanical key switches are arranged around the display screen 50. When the navigation apparatus 3 provides a remote control function, operation switches for the remote control function are arranged in the switch group 30.

The storage 40, in which the map data is stored, inputs various data included in the map data to the navigation controller 10. The various data includes road data, facility data, and guidance data. The road data is indicative of a road connection status, and includes node data, which indicates a predetermined position such as an intersection, and link data, which indicates a link that connects adjacent nodes. The facility data is indicative of a facility on the map. The guidance data is used for route guidance.

The map data stored in the storage is indicative of a map of an area. The map data is divided into one or more predetermined segment data elements, which are indicative of one or more predetermined segments included in the map of the area. The map data may be divided into the predetermined segment data elements based on administrative segments of the area. Further, the map data may also be divided into the predetermined segment data elements based on a determination of a user. Hereinafter, the predetermined segment is also referred to as a mesh, and the predetermined segment data element is also referred to as a mesh data element. Hereinafter, a segment, whose segment data element is to be updated, is also referred to as a target segment or a target mesh, and the segment data element is also referred to as a target segment data element or a target mesh data element. Further, a region which includes one or more target segments is referred to as a target region. The road data and the facility data are updatable by an update data in units of a mesh data element, that is, per mesh data element. Thus, the storage 40 is configured to be rewritable in order to update the mesh data element. For example, a hard disk drive (HDD) and a flash memory may be used as the storage 40.

The display screen 50 is a color display apparatus having a display surface such as a liquid crystal display. The display screen 50 displays various display windows according to video signal transmitted from the navigation controller 10. Specifically, the display screen 50 displays a map image, a guidance route from a start point to a destination, a mark indicating the present position of the vehicle, and other guidance information. The audio output device 60 reports various audio information to the user. With above-described configuration, the route guidance can be performed by displaying viewable information on the display screen 50 and outputting audible information with the audio output device 60.

The communication device 70 performs a data communication with the data center 5. Specifically, the navigation apparatus 3 is wirelessly coupled to a network via the communication device 70 so that the navigation apparatus 3 performs the data communication with the data center 5.

The data center 5, which is disposed at a place outside of the vehicle, mainly includes a data center controller (CENTER CONT) 80. Similar to the navigation controller 10, the data center controller 80 mainly includes a well-known microcomputer, which has a CPU, a ROM, a RAM, an input/output interface and a bus line for coupling the CPU, the ROM, the RAM and the I/O interface. The data center controller 80 includes a communication device (COMM DEVC) 81, a first storage (FIR STORAGE) 82, a second storage (SEC STORAGE) 83, and an information acquisition device (INFO ACQU DEVC) 84. The first storage 82 stores the map data, and the second storage 83 stores update data of target segments, that is, target meshes. Specifically, the update data of the target segments is update data for the segment data elements of the target segments. The information acquisition device 84 acquires information about a communication-defective region (CMDR). In the present disclosure, the communication-defective region is defined as a region where the data communication becomes defective. Specifically, the communication-defective region includes a region where the data communication is disabled, and a region where a communication speed of the data communication is lower than a predetermined communication speed. The region where the data communication is disabled is also referred to as a communication-disabled region.

The communication device 81 of the data center 5 performs the data communication with the navigation apparatus 3. Specifically, the data center 5 is wirelessly coupled to the network via the communication device 81 so that the data center 5 performs the data communication with the navigation apparatus 3.

The first storage 82, in which the map data is stored, inputs the various data included in the map data to the data center controller 80. The various data includes the road data and the facility data. The road data is indicative of a road connection status, and includes node data, which indicates a predetermined position such as an intersection, and link data, which indicates a link that connects adjacent nodes. The facility data is indicative of a facility on the map.

The second storage 83 stores the update data of the target meshes. The update data of the target meshes is stored in units of a mesh data element, and is transmitted from the data center 5 to the navigation apparatus 3 in units of a mesh data element.

The information acquisition device 84 acquires information of the communication-defective region included in the area. The area may include the communication-disabled region due to a positional relationship with a wireless base station. Since the data communication is disabled due to the positional region between the communication-disabled region and the wireless base station, the communication-disabled region is also referred to as a originally communication-disabled region. The information acquisition device 84 acquires the information of the originally communication-disabled region based on the map data of the area. Hereinafter, the map data that indicates the originally communication-disabled region included in the area is also referred to as static area map information. Further, the information acquisition device 84 acquires the information of the communication-defective region based on external information, which is indicative of a real-time communication status performed by a probe and an infrastructure. Hereinafter, the external information that indicates the real-time communication status is also referred to as dynamic external information.

Figure 2:
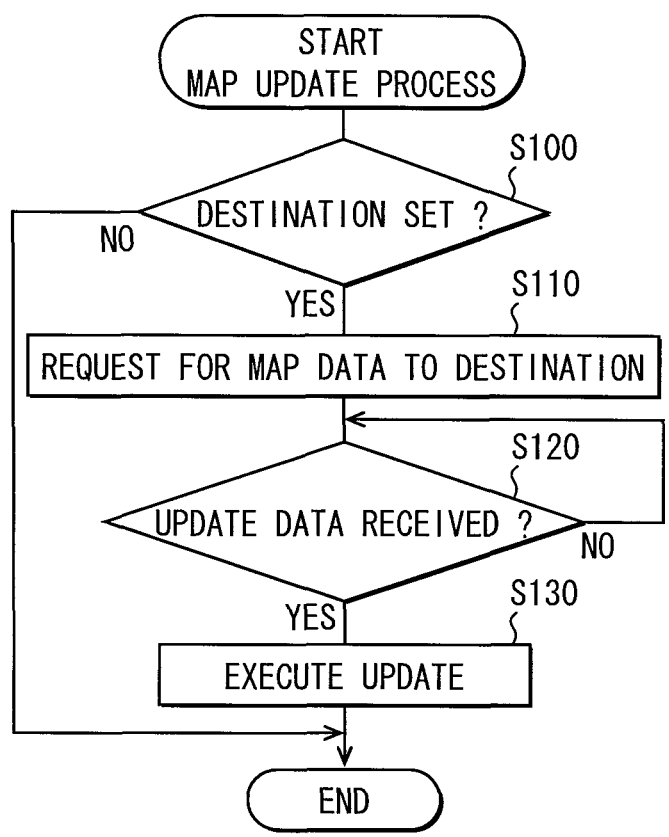
FIG. 2 is a flowchart showing a map update process executed by a navigation apparatus according to a first embodiment.

The following will describe a map update process executed by the navigation controller 10 of the navigation apparatus 3 with reference to FIG. 2. The map update process is repeatedly executed during the navigation apparatus 3 is being supplied with power.

When the map update process starts, at step S100, the navigation controller 10 determines whether a destination is set. With execution of step S100, it is determined whether a destination setting is performed for route guidance in the navigation apparatus 3. The destination may be a name of a facility. When the navigation controller 10 determines that the destination is set (step S100: "YES"), the map update process proceeds to step S110. Further, when the navigation controller 10 determines that the destination is not set (step S100: "NO"), the navigation controller 10 ends the map update process.

At step S110, the navigation controller 10 transmits a request for the update data of the target meshes including the guidance route from the present position to the destination. The request for the update data of the target meshes is also referred to as a map update request. The navigation controller 10 transmits the map update request to the data center 5 via the communication device 70 of the navigation apparatus 3. At this time, information about the present position of the vehicle and the destination set at step S100 is transmitted together with the map update request to the data center 5.

When receiving the map update request, the data center 5 transmits the update data of the target meshes to the navigation apparatus 3. The transmission of the update data of the target meshes by the data center 5 will be described later in detail. At step S120, the navigation controller 10 determines whether the update data of the target meshes is received. When determining that the update data of the target meshes is received (step S120: "YES"), the navigation controller 10 updates the mesh data elements of the target meshes at step S130, and ends the map update process. At step S130, the map data including the road data and the facility data stored in the storage 40 of the navigation apparatus 3 is updated in units of a mesh data element with the update data of the target meshes transmitted from the data center 5. Further, when determining that the update data of the target meshes is not received (step S120: "NO"), step S120 is repeatedly executed.

The following will describe an update data transmission process executed by the data center controller 80 of the data center 5 with reference to FIG. 3. The update data transmission process is repeatedly executed at predetermined time periods.

When the update data transmission process starts, at step S200, the data center controller 80 determines whether the map update request is received. With execution of step S200, it is determined whether the map update request is transmitted from the navigation apparatus 3. Step S200 in FIG. 3 corresponds to step S110 in FIG. 2. When the data center controller 80 determines that the map update request is received (step S200: "YES"), the update data transmission process proceeds to step S210. Further, when the data center controller 80 determines that the map update request is not received (step S200: "NO"), the data center controller 80 ends the update data transmission process.

At step S210, the data center controller 80 sets a guidance route from the present position to the destination. As described above, the information about the present position and the destination is transmitted, together with the map update request, from the navigation apparatus 3 to the data center 5. The data center controller 80 sets the guidance route based on the information about the present position and the destination.

Figure 4A:
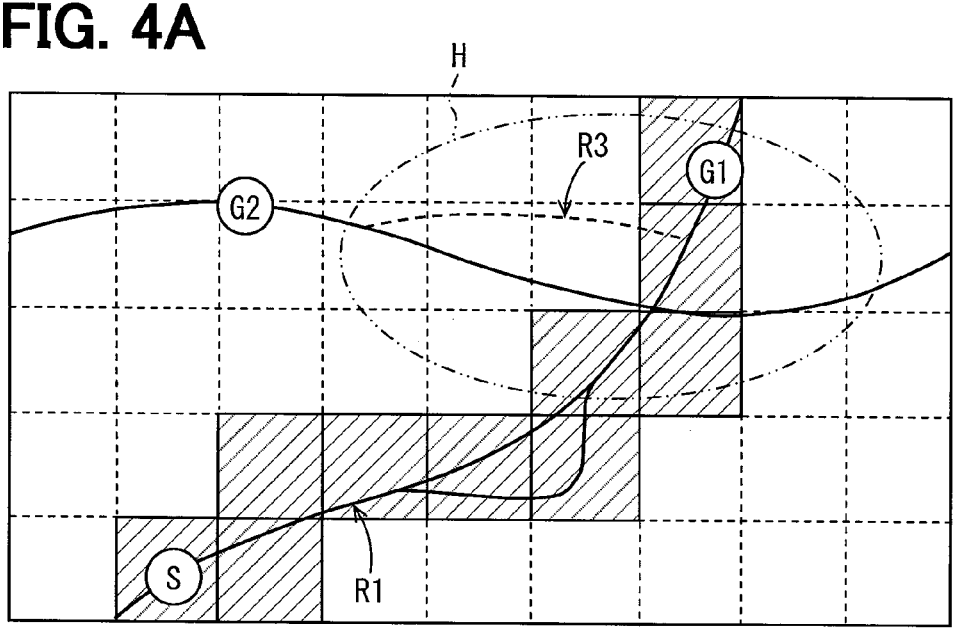
FIG. 4A and FIG. 4B are schematic diagrams showing examples of transmitting update data according to the first embodiment.

At step S220, the data center controller 80 specifies the target meshes that include the guidance route. The target meshes are the meshes, whose mesh data elements are to be updated. With execution of step S220, the data center controller 80 specifies the target meshes including the guidance route set at step S210. Specifically, as shown in FIG. 4A, the data center controller 80 specifies the target meshes including the guidance route from the present position S, which is also a start point, to the destination G1. In FIG. 4A, the target meshes specified by the data center controller 80 are hatched by slant lines.

At step S230, the data center controller 80 searches for a target communication-defective region. Specifically, the data center controller 80 searches the communication-defective region acquired by the information acquisition device 84 for the target communication-defective region, which includes the guidance route set at step S210. The target communication-defective region is included in the communication-defective region. In the present embodiment, the data center controller 80 searches for a communication-disabled region as the target communication-defective region.

At step S240, the data center controller 80 determines whether the target communication-defective region exists. When the data center controller 80 determines that the target communication-defective region exists (step S240: "YES"), the process proceeds to step S250. Further, when the data center controller 80 determines that the target communication-defective region does not exist (step S240: "NO"), the process proceeds to step S260 without execution of step S250.

At step S250, the data center controller 80 specifies the meshes including the target communication-defective region. With execution of step S250, the meshes including the target communication-defective region are specified. Specifically, when the data center controller 80 searched for the target communication-defective region H as shown in FIG. 4A, the meshes including the target communication-defective region H are added to the target meshes including the guidance route as shown in FIG. 4B.

At step S260, the data center controller 80 transmits the update data of the target meshes. That is, when the guidance route from the start point S to the destination G1 is set, the data center controller 80 transmits the update data of the target meshes shown by hatched lines in FIG. 4B to the navigation apparatus 3. Further, at step S260, the data center controller 80 transmits the update data of the target meshes when the mesh data elements of the target meshes shown in FIG. 4B have not undergone a latest update. Specifically, when a target mesh has not undergone the latest update, the data center controller 80 transmits a corresponding update data of the target mesh that has not undergone the latest update. Further, when the target mesh has undergone the latest update, the data center controller 80 transmits does not transmit the corresponding update data of the target mesh that has undergone the latest update. Hereinafter, a mesh data element that has not undergone a latest update is also referred to as a non-latest mesh data element, and a mesh data element that has undergone a latest update is also referred to as a latest mesh data element. Thus, when a mesh data element of the target mesh is the non-latest mesh data element, the data center controller 80 transmits the corresponding update data of the target mesh, and when the mesh data element of the target mesh is the latest mesh data element, the data center controller 80 does not transmit the corresponding update data of the target mesh.

As described above, in the navigation system 1 according to the present embodiment, the data center 5 sets the guidance route from the present position to the destination (step S210) when the map update request is transmitted from the navigation apparatus 3 (step S200 in FIG. 3: "YES"). Further, the data center 5 specifies the target meshes including the guidance route (step S220). The data center 5 further searches for the target communication-defective region (step S230), and adds the meshes including the target communication-defective region to the target meshes (step S250), when the target communication-defective region exists (step S240: "YES"). Further, when the mesh data elements of the target meshes are the non-latest mesh data elements, the data center 5 transmits the update data of the target meshes to the navigation apparatus 3 (step S260).

Figure 4B:
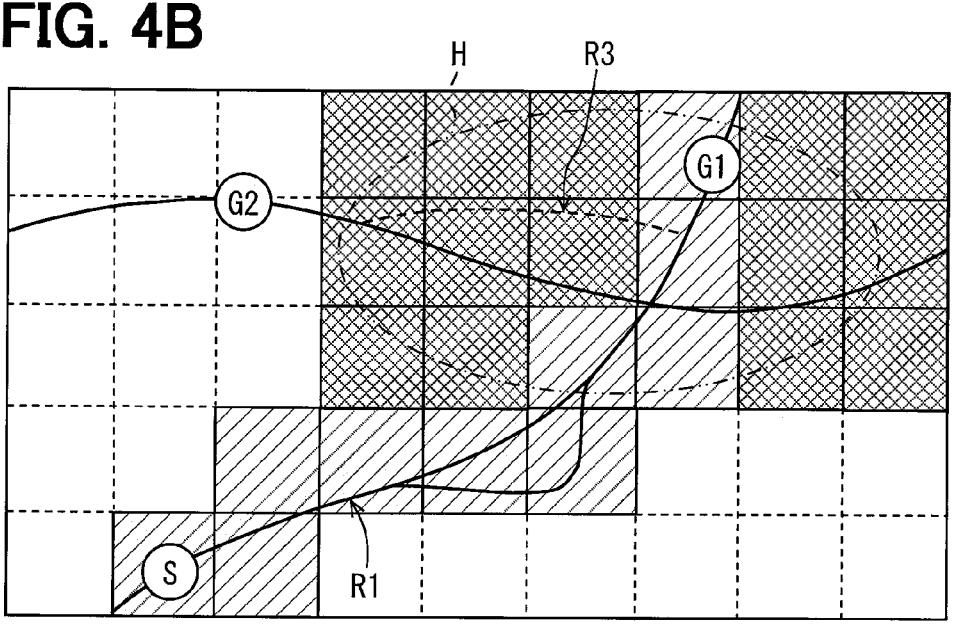
Figure 5:
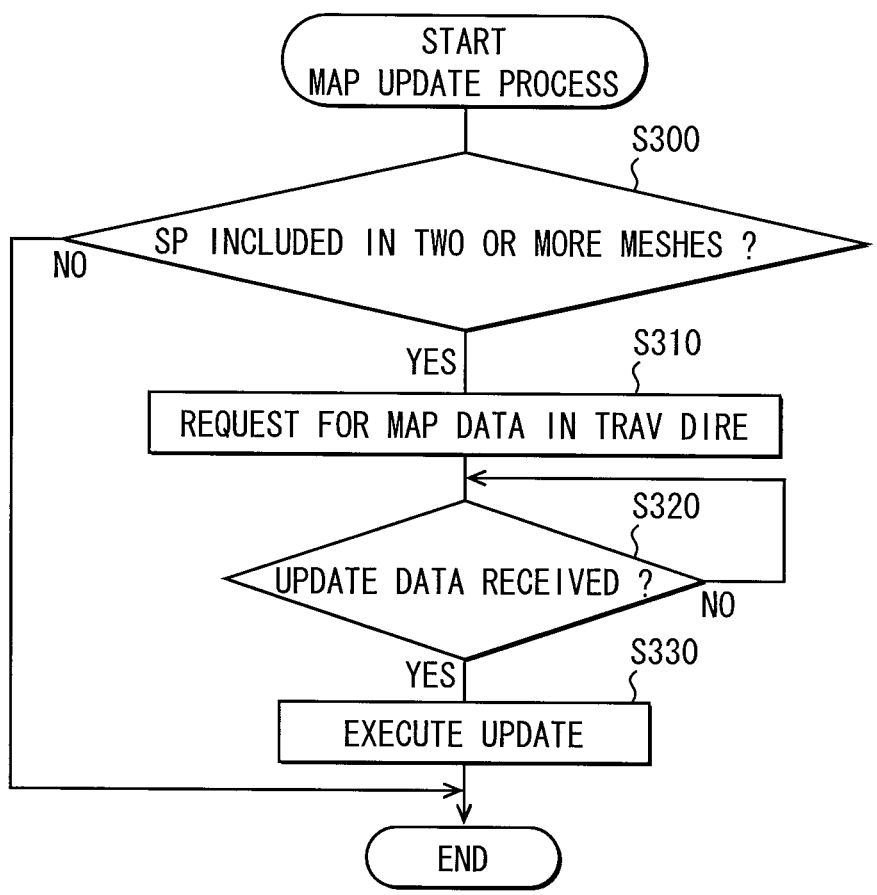
FIG. 5 is a flowchart showing a map update process executed by a navigation apparatus according to a second embodiment.

As shown in FIG. 4B, the update data of the target meshes shown by hatched lines is transmitted to the navigation apparatus 3 when the destination, specifically, the guidance route, is set. With this configuration, when searching for a new guidance route from a new start point, which is the present destination G1, to a new destination G2, a newly created route R3 is shown to the user. Thus, when the communication-defective region exists around the guidance route, the start point, and the destination, the map data is updated before entering the communication-defective region in order to provide a proper guidance to the user. In the present disclosure, the navigation apparatus is described as a navigation apparatus that performs a route guidance. Further, the navigation apparatus may provide the proper guidance without displaying a guidance route. Specifically, the proper guidance may include a guidance provided by displaying only a map without a guidance route. That is, when an updated map is shown to the user, the user drives the vehicle based on a latest road condition. Thus, the proper guidance is provided to the user.

In the present embodiment, the information acquisition device 84 of the data center 5 acquires the information of the communication-defective region based on the static area map information, and further acquires the information of the communication-defective region based on the dynamic external information. The dynamic external information is indicative of the real-time communication status performed by the probe and the infrastructure. With this configuration, the data center 5 acquires the information of the communication-defective region in static and in real time.

In the present embodiment, at step S260 of the update data transmission process shown in FIG. 3, the data center 5 transmits the update data of the target meshes, to the navigation apparatus 3, only when the mesh data elements of the target meshes are the non-latest mesh data elements. That is, the data center 5 transmits the update data of the target meshes when the mesh data elements of the target meshes have not undergone the latest update. Thus, data amount of the update data to be transmitted is reduced.

The information acquisition device 84 may function as a communication-defective region acquisition device. The data center controller 80 of the data center 5 may function as a communication-defective region search device, a target region specify device, and an update data transmission device.

Specifically, in FIG. 3, step S230 executed by the data center controller 80 of the data center 5 functions as the communication-defective region search device, step S250 executed by the data center controller 80 of the data center 5 functions as the target region specify device, and step S260 executed by the data center controller 80 of the data center 5 functions as the update data transmission device.

Second Embodiment

A second embodiment of the present disclosure will be described with reference to FIG. 5 to FIG. 7B. In the second embodiment, a map update process executed by the navigation controller 10 of the navigation apparatus 3 and an update data transmission process executed by the data center controller 80 of the data center 5 are different from the first embodiment.

In the second embodiment, configurations of the navigation apparatus 3 and the data center 5 similar to the navigation apparatus 3 and the data center 5 of the first embodiment are omitted, and only the map update process and the update data transmission process will be described.

Figure 6:
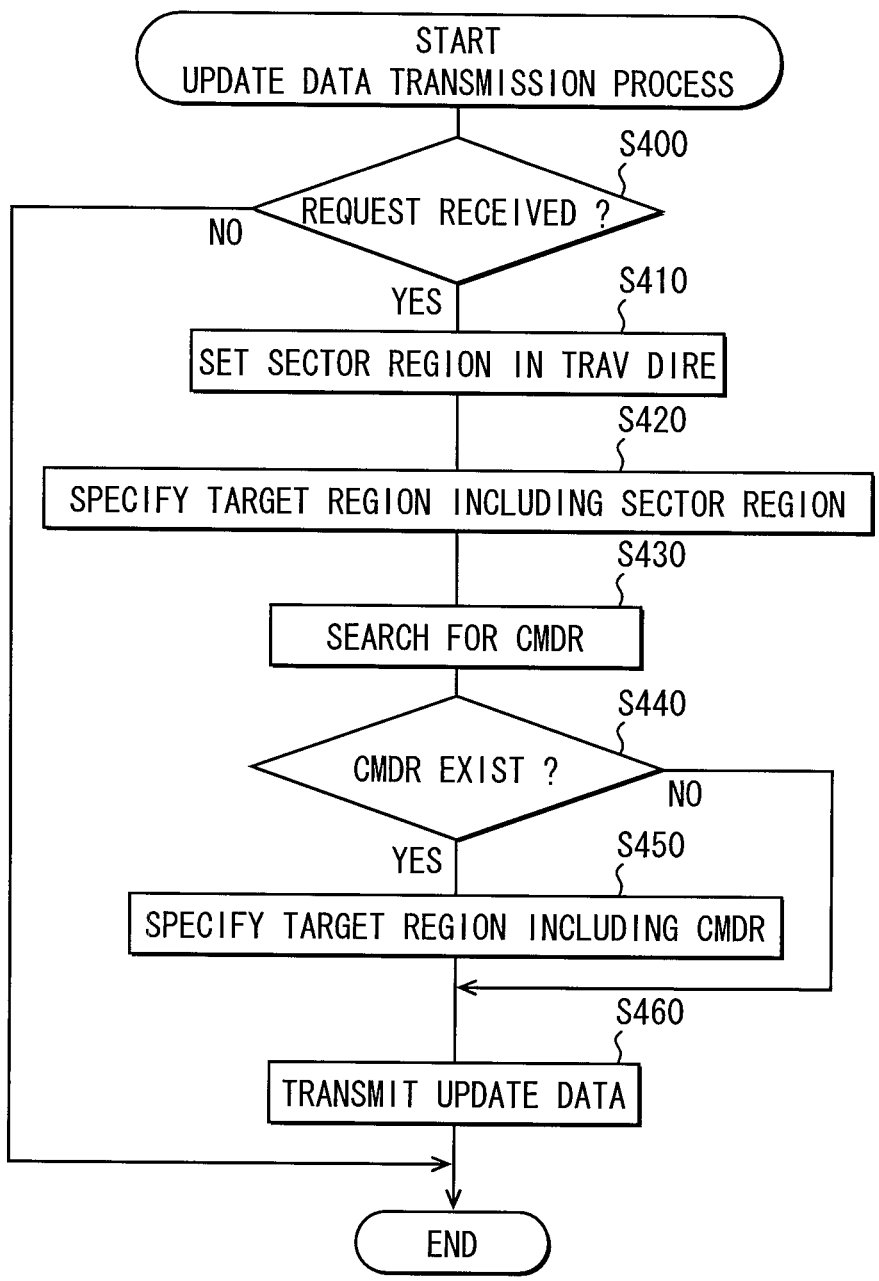
FIG. 6 is a flowchart showing an update data transmission process executed by a data center according to the second embodiment.

The following will describe an update data transmission process executed by the data center controller 80 of the data center 5 with reference to FIG. 6. The update data transmission process is repeatedly executed at predetermined time periods.

When the map update process starts, at step S300, the navigation controller 10 determines whether a start point (SP) is included in two or more meshes. With execution of S300, an update time of the map data is determined. In the present embodiment, the update of the map data is performed when the start point is included in the two or more meshes. When the navigation controller 10 determines that the start point is included in the two or more meshes (step S300: "YES"), the map update process proceeds to step S310. Further, when the navigation controller 10 determines that the start point is included in one mesh (step S300: "NO"), the navigation controller 10 ends the map update process.

At step S310, the navigation controller 10 transmits a request for the update data of the target meshes, which are positioned in a traveling direction (TRAV DIRE) of the vehicle. The request for the update data of the target meshes is a map update request. The navigation controller 10 transmits the map update request to the data center 5 via the communication device 70 of the navigation apparatus 3. Information about the present position and the traveling direction of the vehicle is transmitted to the data center 5 together with the map update request.

When receiving the map update request, the data center 5 transmits the update data of the target meshes to the navigation apparatus 3. The transmission of the update data of the target meshes by the data center 5 will be described later in detail. At step S320, the navigation controller 10 determines whether the update data of the target meshes is received. When determining that the update data of the target meshes is received (step S320: "YES"), the navigation controller 10 updates the mesh data elements of the target meshes at step S330, and ends the map update process. At step S330, the road data and the facility data stored in the storage 40 of the navigation apparatus 3 is updated in units of a mesh data element with the update data of the target meshes transmitted from the data center 5. Further, when determining that the map update data of the target meshes is not received (step S320: "NO"), step S320 is repeatedly executed.

The following will describe an update data transmission process executed by the data center controller 80 of the data center 5 with reference to FIG. 6. The update data transmission process is repeatedly executed at predetermined time periods.

When the update data transmission process starts, at step S400, the data center controller 80 determines whether the map update request is received. With execution of step S400, it is determined whether the map update request is transmitted from the navigation apparatus 3. The step S420 corresponds to the step S310 in FIG. 5. When the data center controller 80 determines that the map update request is received (step S400: "YES"), the update data transmission process proceeds to step S410. Further, when the data center controller 80 determines that the map update request is not received (step S400: "NO"), the data center controller 80 ends the update data transmission process.

At step S410, the data center controller 80 sets a sector region in the traveling direction of the vehicle. As described above, the information about the present position and the traveling direction of the vehicle is transmitted together with the map update request from the navigation apparatus 3 to the data center 5. The data center controller 80 sets the sector region based on the information about the present position and the traveling direction of the vehicle.

Figure 7A:
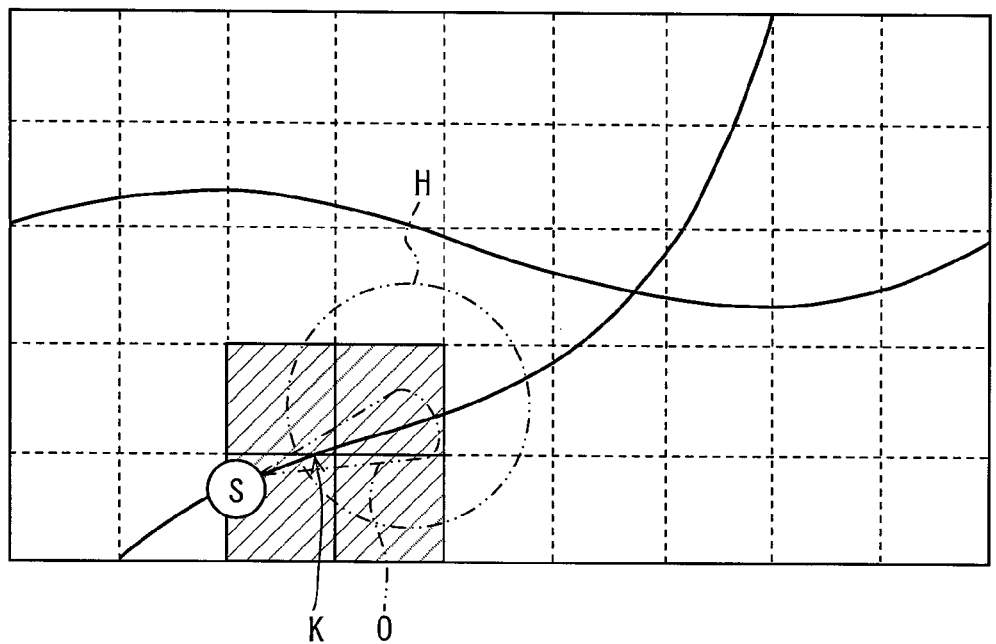
FIG. 7A and FIG. 7B are schematic diagrams showing examples of transmitting update data according to the second embodiment.

At step S420, the data center controller 80 specifies the target meshes that include the sector region. The target meshes are the meshes, whose mesh data elements are to be updated. With execution of step S420, the data center controller 80 specifies the target meshes including the sector region set at step S410. Specifically, as shown in FIG. 7A, the data center controller 80 specifies the target meshes including the sector region O in the traveling direction starting from the present position S. In FIG. 7A, the target meshes specified by the data center controller 80 are hatched by slant lines.

At step S430, the data center controller 80 searches for a target communication-defective region. Specifically, the data center controller 80 search the communication-defective region acquired by the information acquisition device 84 for a target communication-defective region, which includes the sector region set at step S410. The target communication-defective region is included in the communication-defective region. In the present embodiment, the data center controller 80 searches for a communication-disabled region as the target communication-defective region.

At step S440, the data center controller 80 determines whether the target communication-defective region exists. When the data center controller 80 determines that the target communication-defective region exists (step S440: "YES"), the process proceeds to step S450. Further, when the data center controller 80 determines that the target communication-defective region does not exist (step S440: "NO"), the process proceeds to step S460 without execution of step S450.

At step S450, the data center controller 80 specifies the meshes including the target communication-defective region. With execution of step S450, the meshes including the communication-defective region are specified. Specifically, when the data center controller 80 searched for the target communication-defective region H as shown in FIG. 7A, the meshes including the communication-defective region H are added to the target meshes including the sector region as shown in FIG. 7B.

At step S460, the data center controller 80 transmits the update data of the target meshes. That is, when the start point S is included in the two or more meshes, the data center controller 80 transmits the update data of the target meshes shown by hatched lines in FIG. 7B. Further, at step S460, the data center controller 80 transmits the update data of the target meshes when the mesh data elements of the target meshes shown in FIG. 7B are non-latest mesh data elements. That is, when the mesh data elements of the target meshes are the latest mesh data elements, which have undergone the latest update, the data center controller 80 does not transmit the update data of the target meshes.

As described above, in the navigation system 1 according to the present embodiment, the data center 5 sets the sector region from the present position in the traveling direction (step S410) when the map update request is transmitted from the navigation apparatus 3 (step S400 in FIG. 6: "YES"). Further, the data center 5 specifies the target meshes including the sector region (step S420). The data center 5 further searches for the target communication-defective region (step S430), and adds the meshes including the target communication-defective region to the target meshes (step S450), when the target communication-defective region exists (step S440: "YES"). Further, when the mesh data elements of the target meshes are the non-latest mesh data elements, the data center 5 transmits the update data of the target meshes to the navigation apparatus 3 (step S460).

Figure 7B:
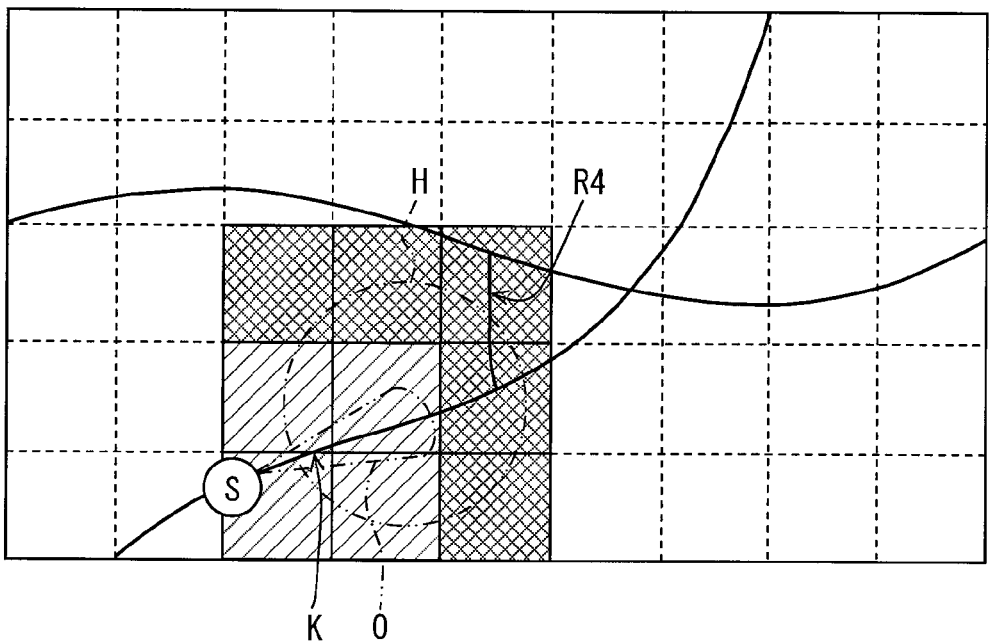

As shown in FIG. 7B, the update data of the target meshes shown by hatched lines is transmitted to the navigation apparatus 3 when the start point is included in the two or more meshes. With this configuration, when a route search is performed after entering the communication-defective region H, a newly created route R4 is shown to the user. Thus, when the communication-defective region exists around the sector region, the map data is updated before entering the communication-defective region in order to provide a proper guidance to the user. Further, the newly created route R4 may be displayed even when the route search is not performed. By this configuration, the user is notified of a latest road condition during the traveling. The navigation system 1 according to the present embodiment provides similar advantages to the navigation system 1 according to the foregoing embodiment. Specifically, in the present embodiment, the data center 5 acquires the communication-defective region in real time. Further, data amount of the update data to be transmitted is reduced by transmitting the update data of the target meshes only when the mesh data elements of the target meshes have not undergone the latest update.

As shown ink FIG. 6, step S430 executed by the data center controller 80 of the data center 5 functions as the communication-defective region search device, step S450 executed by the data center controller 80 of the data center 5 functions as the target region specify device, and step S460 executed by the data center controller 80 of the data center 5 functions as the update data transmission device.

Third Embodiment

In the foregoing embodiments, when receiving the map update request from the navigation apparatus 3 (step S110 in FIG. 2, step S310 in FIG. 5), the data center 5 searches for the target communication-defective region (step S230 in FIG. 3, step S430 in FIG. 6). Then, the data center 5 specifies the target meshes including the target communication-defective region (step S250 in FIG. 3, step S450 in FIG. 6), and transmits the update data of the target meshes to the navigation apparatus 3 (step S260 in FIG. 3, step S460 in FIG. 6).

In the navigation system 1 according to the present embodiment, the navigation apparatus 3 searches for the target communication-defective region, and specifies the target meshes including the target communication-defective region. Then, the navigation apparatus 3 transmits a request for the update data of the target meshes. In this case, the navigation apparatus 3 includes the information acquisition device 84, which is shown in FIG. 1, instead of the data center 5.

Figure 8:
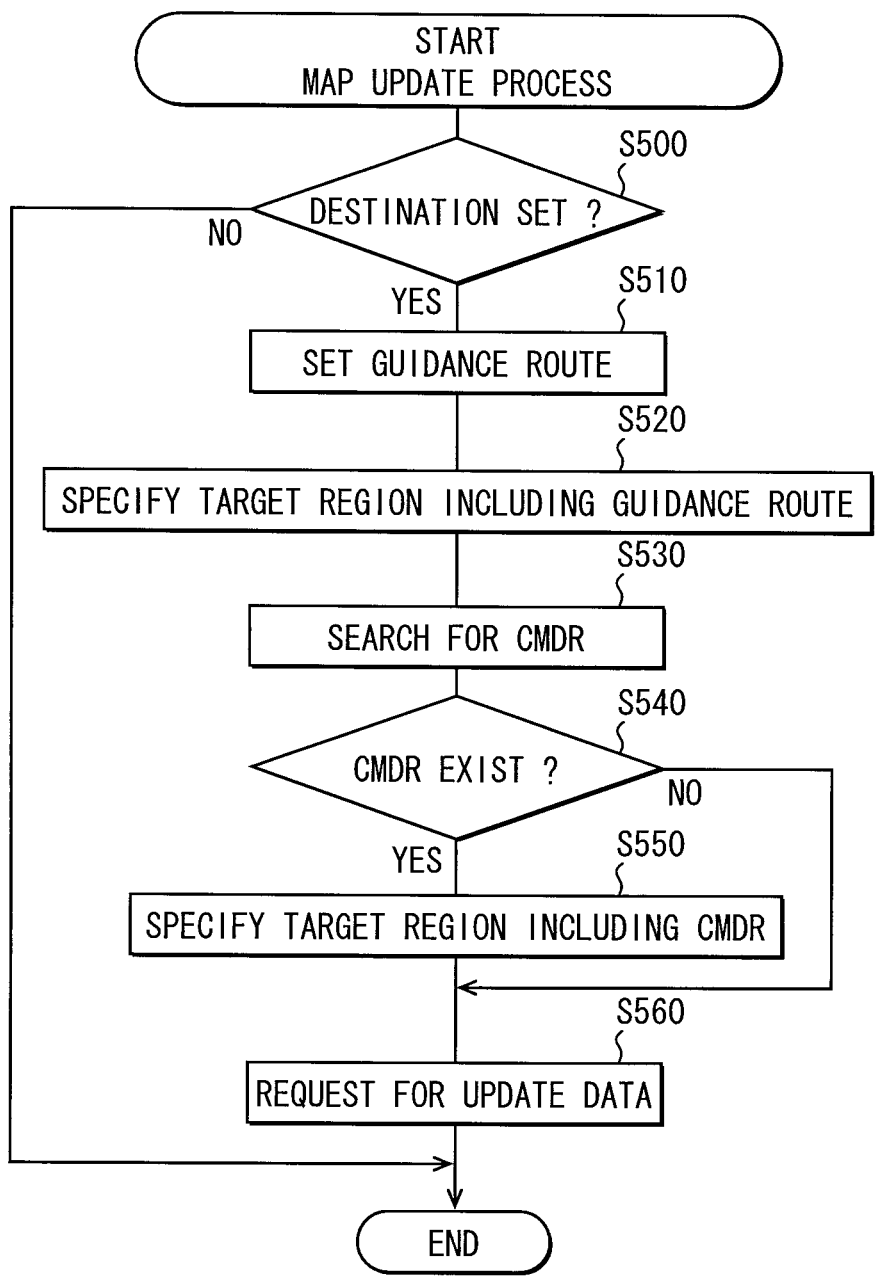
FIG. 8 is a flowchart showing a map update process executed by a navigation apparatus according to a third embodiment.

The following will describe the map update process executed by the navigation controller 10 of the navigation apparatus 3 with reference to FIG. 8. The map update process shown in FIG. 8 is repeatedly executed during the navigation apparatus 3 is being supplied with power.

When the map update process starts, at step S500, the navigation controller 10 determines whether a destination is set. With execution of step S500, it is determined whether a destination setting is performed for route guidance in the navigation apparatus 3. When the navigation controller 10 determines that the destination is set (step S500: "YES"), the map update process proceeds to step S510. Further, when the navigation controller 10 determines that the destination is not set (step S500: "NO"), the navigation controller 10 ends the map update process.

At step S510, the navigation controller 10 sets a guidance route from the present position to the destination. At step S520, the navigation controller 10 specifies the target meshes that include the guidance route. With execution of step S520, the navigation controller 10 specifies the target meshes including the guidance route set at step S510.

At step S530, the navigation controller 10 searches for a target communication-defective region. With execution of step S530, the navigation controller 10 searches for the target communication-defective region including the guidance route set at step S510. In the present embodiment, the navigation controller 10 searches for a communication-disabled region as the target communication-defective region. The target communication-defective region is included in the communication-defective region.

At step S540, the navigation controller 10 determines whether the target communication-defective region exists. When the navigation controller 10 determines that the target communication-defective region exists (step S540: "YES"), the process proceeds to step S550. Further, when the navigation controller 10 determines that the target communication-defective region does not exist (step S540: "NO"), the process proceeds to step S560 without execution of step S550.

At step S550, the navigation controller 10 specifies the meshes including the target communication-defective region. With execution of step S550, the meshes including the target communication-defective region are specified.

At step S560, the navigation controller 10 transmits a request for update data of the target meshes to the data center 5, and ends the map update process. When receiving the request for the update data of the target meshes, the data center 5 transmits the update data of the target meshes to the navigation apparatus 3.

The navigation system 1 according to the present embodiment provides similar advantages to the navigation system 1 according to the foregoing embodiments. In the present embodiment, the information acquisition device 84 included in the navigation apparatus 3 may function as the communication-defective region acquisition device. Further, the navigation controller 10 of the navigation apparatus 3 may function as the communication-defective region search device and the target region specify device. The data center controller 80 of the data center 5 may function as the update data transmission device.

Specifically, in FIG. 8, step S530 executed by the navigation controller 10 of the navigation apparatus 3 functions as the communication-defective region search device, step S550 executed by the navigation controller 10 of the navigation apparatus 3 functions as the target region specify device. Further, a transmission process is executed by the data center controller 80 of the data center 5 in response to step S560 executed by the navigation controller 10 of the navigation apparatus 3. The transmission process executed by the data center controller 80 of the data center 5 functions as the update data transmission device.

Fourth Embodiment

Similar to the navigation system 1 according to the third embodiment, in the navigation system 1 according to the present embodiment, the navigation apparatus 3 searches for the target communication-defective region, and specifies the target meshes including the target communication-defective region. Then, the navigation apparatus 3 transmits a request for the update data of the target meshes to the data center 5. In this case, the navigation apparatus 3 includes the information acquisition device 84, which is shown in FIG. 1, instead of the data center 5.

Figure 9:
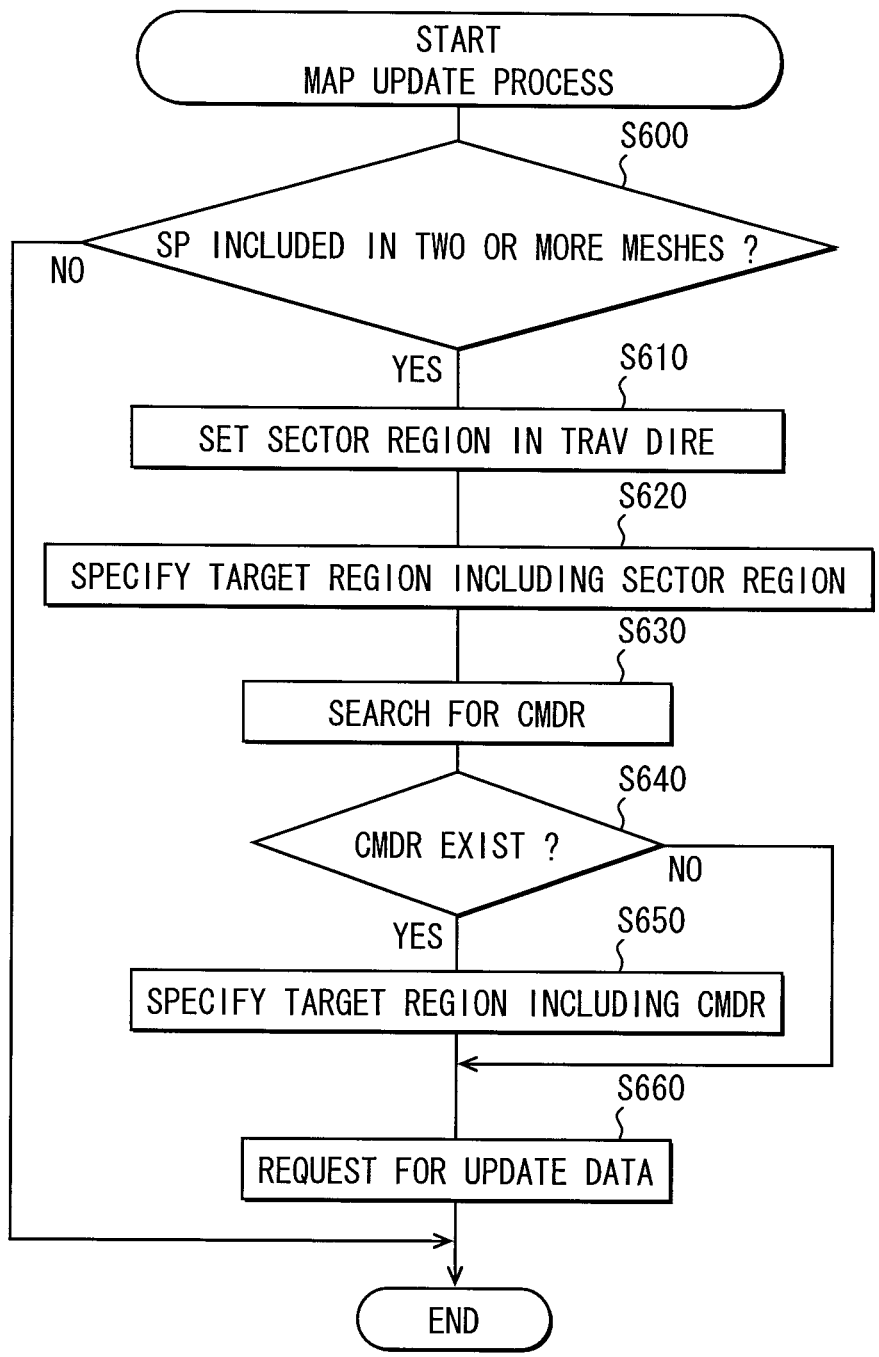
FIG. 9 is a flowchart showing a map update process executed by a navigation apparatus according to a fourth embodiment.

The following will describe the map update process executed by the navigation controller 10 of the navigation apparatus 3 with reference to FIG. 9. The map update process shown in FIG. 9 is repeatedly executed at predetermined time periods during the navigation apparatus 3 is being supplied with power.

When the map update process starts, at step S600, the navigation controller 10 determines whether a start point is included in two or more meshes. When the navigation controller 10 determines that the start point is included in the two or more meshes (step S600: "YES"), the map update process proceeds to step S610. Further, when the navigation controller 10 determines that the start point is included in one mesh (step S600: "NO"), the navigation controller 10 ends the map update process.

At step S610, the navigation controller 10 sets a sector region in the traveling direction of the vehicle. At step S620, the navigation controller 10 specifies the target meshes that include the sector region. With execution of step S620, the navigation controller 10 specifies the target meshes including the sector region set at step S610.

At step S630, the navigation controller 10 searches for a target communication-defective region. With execution of step S630, the navigation controller 10 searches for a target communication-defective region, which includes the sector region set at step S610. In the present embodiment, the navigation controller 10 searches for a communication-disabled region as the target communication-defective region. The target communication-defective region is included in the communication-defective region.

At step S640, the navigation controller 10 determines whether the target communication-defective region exists. When the navigation controller 10 determines that the target communication-defective region exists (step S640: "YES"), the navigation controller 10 adds the meshes including the target communication-defective region to the target meshes at step S650. Then, the process proceeds to step S660. Further, when the navigation controller 10 determines that the target communication-defective region does not exist (step S640: "NO"), the process proceeds to step S660 without execution of step S650.

At step S660, the navigation controller 10 transmits a request for update data of the target meshes to the data center 5, and ends the map update process. When receiving the request for the update data of the target meshes, the data center 5 transmits the update data of the target meshes to the navigation apparatus 3.

The navigation system 1 according to the present embodiment provides similar advantages to the navigation system 1 according to the foregoing embodiments. In the present embodiment, the information acquisition device 84 included in the navigation apparatus 3 may function as the communication-defective region acquisition device. Further, the navigation controller 10 of the navigation apparatus 3 may function as the communication-defective region search device and the target region specify device. The data center controller 80 of the data center 5 may function as the update data transmission device.

Specifically, in FIG. 9, step S630 executed by the navigation controller 10 of the navigation apparatus 3 functions as the communication-defective region search device, step S650 executed by the navigation controller 10 of the navigation apparatus 3 functions as the target region specify device. Further, a transmission process is executed by the data center controller 80 of the data center 5 in response to step S560 executed by the navigation controller 10 of the navigation apparatus 3. The transmission process executed by the center controller 80 of the data center 5 functions as the update data transmission device.

In the foregoing embodiments, the communication-disabled region is searched for as the communication-defective region. Further, a region having a communication speed lower than a predetermined communication speed may be searched for as the communication-defective region.

For example, a region may be defined as a high speed region when a communication speed in the region is higher than one megabit per second. A region may be defined as a normal speed region when a communication speed in the region is higher than one hundred kilobits per second and lower than one megabit per second. A region may be defined as a low speed region when a communication speed in the region is higher than fifty kilobits per second and lower than one hundred kilobits per second. A region may be defined as an extremely low speed region when a communication speed in the region is lower than one hundred kilobits per second. In this case, the low speed region and the extremely low speed region, in which the communication speed is lower than one hundred kilobits per second, may be defined as the communication-defective region.

When the communication-defective region is defined based on the communication speed in a region as described above, the target meshes may be specified based on the communication speed.

Figure 10A:
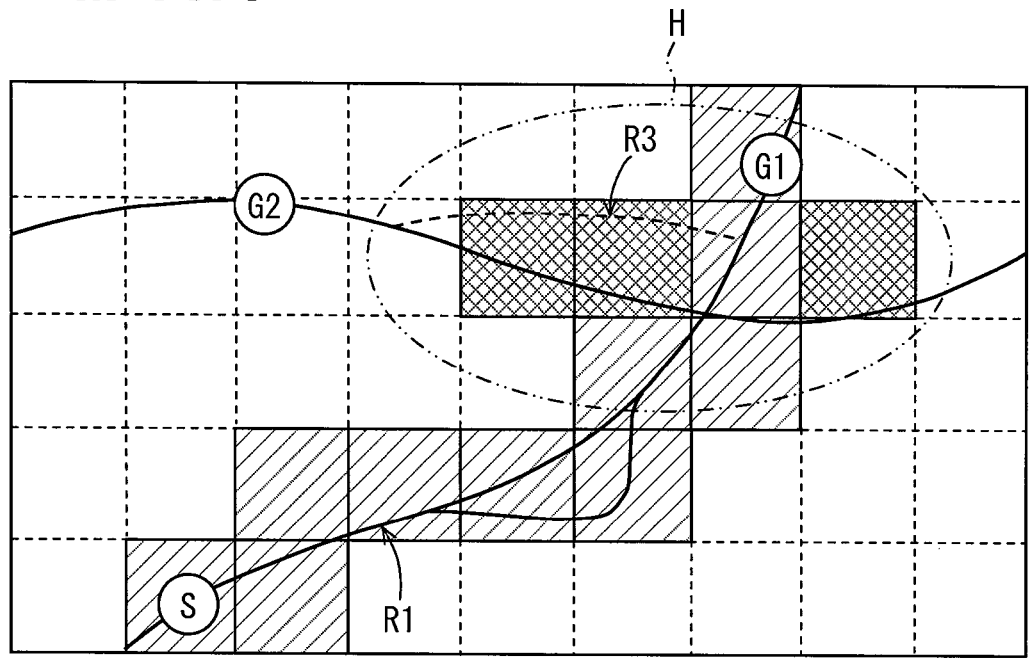
FIG. 10A and FIG. 10B are schematic diagrams showing examples of transmitting update data.

For example, as shown in FIG. 4B, when the communication-defective region H is the extremely low speed region, the target meshes may be specified in such a manner that the communication-defective region H is totally included in the target meshes. Further, as shown in FIG. 10A, when the communication-defective region H is the low speed region, the target meshes may be specified in such a manner that the target meshes are totally included in the communication-defective region H. In this case, the number of the target meshes, which is defined by the communication speed, is reduced. Thus, data amount of update data of the target meshes is reduced.

In the foregoing embodiments, the road data and the facility data stored in the storage 40 is updated by the update data, which is transmitted from the data center 5 in units of a mesh data element. Further, the data center 5 may further transmit update data of the meshes including newly created roads. In a case where the vehicle is traveling on an expressway, at a place other than a junction or an interchange, road division guidance is not available. Thus, the data center 5 may transmit update data of the meshes, which include a division and a route that is likely to be used by the user.

Figure 10B:
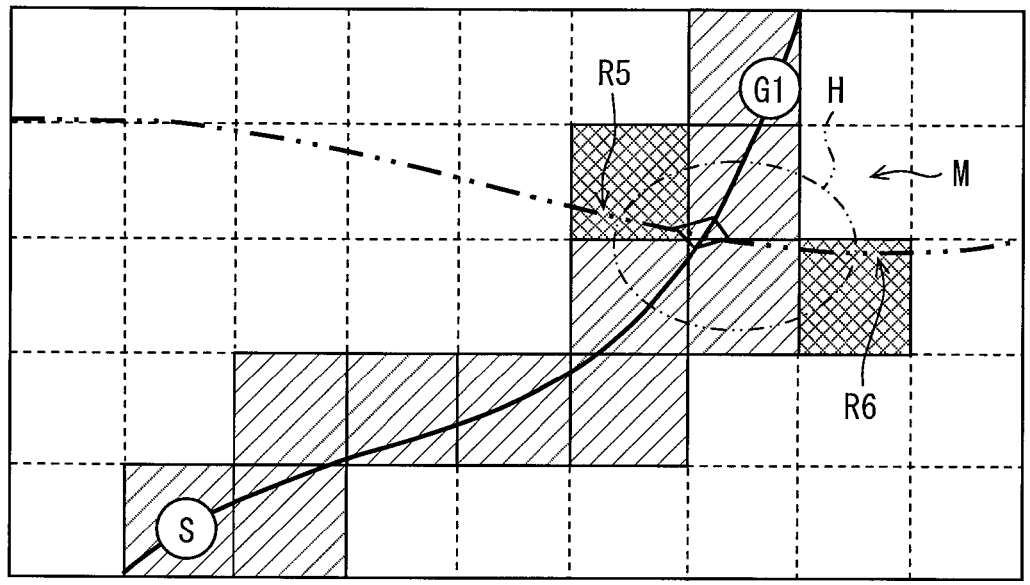

For example, as shown in FIG. 10B, among the meshes including the communication-defective region H, update data of a mesh including a newly created road R5 and a mesh including a newly created road R6 may be transmitted to the navigation apparatus 3. Among the meshes including the communication-defective region H, a mesh shown by an arrow M does not include a newly created road. Thus, update data of the mesh shown by the arrow M is not transmitted to the navigation apparatus 3. Further, when the newly created roads R5, R6 are the divided roads from the presently traveling road, the update data of the newly created roads R5, R6 is transmitted. With this configuration, data amount of the update data to be transmitted is reduced.

The above disclosure has the following aspects.

According to an aspect of the present disclosure, the navigation system includes a navigation apparatus, which performs a route guidance, and a data center, which performs a data communication with the navigation apparatus. The navigation apparatus stores map data including a plurality of segment data elements. The map data is indicative of a map of an area, each of the plurality of segment data elements is indicative of a segment included in the area. The data center transmits an update data of a target region, which is included in the area, to the navigation apparatus. The target region includes one or more target segments whose segment data elements are to be updated by the update data. The update data of the target region is transmitted to the navigation apparatus per segment data element. The map data is divided into the plurality of the segment data elements so that the map data is updated per segment data element. The map data may be divided into the plurality of segment data elements based on administrative segments of the area. The map data may also be divided into the plurality of the segment data elements based on a determination of a user. The navigation apparatus may be a portable terminal, such as a smart phone having a navigation function, other than a device equipped to a vehicle.

The communication-defective region acquisition device acquires information of a communication-defective region. The communication-defective region is included in the area and is defined as a region where the data communication becomes defective. For example, the communication-defective region acquisition device may acquire the information of the communication-defective region from the map data stored in the storage of the navigation apparatus. Further, the communication-defective region search device searches for a part of the communication-defective region as a target communication-defective region, which includes a route scheduled to go through. The route scheduled to go through is defined as a route, which is likely to be used by the user in an immediate future.

The target region specify device specifies the target region based on the communication-defective region. The update data transmission device of the data center transmits update data of the target region to the navigation apparatus before the navigation apparatus enters the communication-defective region.

With above-described configuration, the update data of the target region, which is specified based on the communication-defective region, is transmitted to the navigation apparatus before the navigation apparatus enters the communication-defective region. That is, the navigation apparatus acquires the update data of the target region before entering the communication-defective region. Thus, when a communication-defective region exists around the route scheduled to go through, the map data stored in the navigation apparatus is updated in order to provide a proper guidance to a user.

Further, the navigation apparatus according to the present disclosure is described as a navigation apparatus that performs a route guidance. Further, the navigation apparatus may provide the proper guidance without displaying a guidance route. Specifically, the proper guidance may include a guidance provided by displaying only a map without a guidance route. That is, when an updated map is shown to the user, the user drives the vehicle based on a latest road condition. Thus, the proper guidance is provided to the user.

Further, the target region specify device may specify the target region in such a manner that the target region includes the communication-defective region. In this case, the navigation apparatus acquires the update data of the target region including the communication-defective region before entering the communication-defective region. Thus, when the communication is disabled after entering the communication-defective region, the navigation system provides the proper guidance by updating the map data.

Further, when a guidance route is set, the target region specify device may specify a first target region in such a manner that the first target region includes the guidance route. Then, the communication-defective region search device may search for the target communication-defective region, which includes the guidance route. Further, the target region specify device may specify a second target region in such a manner that the second target region includes the target communication-defective region. In this case, the target region includes the first target region, which includes the guidance route, and the second target region, which includes the target communication-defective region. With this configuration, when the communication-defective region exists in the guidance route, the navigation system provides the proper guidance by updating the map data. In this case, the update data of the target region may be transmitted to the navigation apparatus, for example, when the guidance route is set.

Further, the target region specify device may specify a first target region in such a manner that the first target region includes a road ahead in a traveling direction. Then, the communication-defective region search device may search for the target communication-defective region, which includes the road ahead in the traveling direction. Further, the target region specify device may specify a second target region in such a manner that the second target region includes the target communication-defective region. In this case, the target region includes the first target region, which includes the road ahead in the traveling direction, and the second target region, which includes the target communication-defective region. With this configuration, when the communication-defective region exists in the road ahead in the traveling direction, the navigation system provides the proper guidance by updating the map data. Further, in this case, the update data of the target region may be transmitted based on the traveling direction of the vehicle. In this case, the update data of the target region may be transmitted to the navigation apparatus when the vehicle is being included in two or more segments of the area.

Further, the communication-defective region acquisition device may acquire information of the communication-defective region based on static area map information indicative of the communication-defective region. In this case, information of the communication-defective region is acquired in a relatively easy way.

Further, the static area map information may indicate a region where the data communication is originally disabled due to a positional relationship between the region and a wireless base station. In this case, static information of the communication-defective region is acquired in a relatively easy way.

Further the communication-defective region acquisition device may acquire the information of the communication-defective region based on dynamic external information indicative of the communication-defective region. For example, the dynamic external information may be a real-time communication status performed by a probe and an infrastructure. Thus, in this case, the information of the communication-defective region is acquired based on the dynamic external information in real time compared with a case where the information of the communication-defective region is acquired only based on the static area map information.

Further, the communication-defective region may be defined as a region, where the data communication is disabled.

Further, the communication-defective region may be defined as a region where a communication speed of the data communication is lower than a predetermined communication speed. For example, a region may be defined as a high speed region when a communication speed in the region is higher than one megabit per second. A region may be defined as a normal speed region when a communication speed in the region is higher than one hundred kilobits per second and lower than one megabit per second. A region may be defined as a low speed region when a communication speed in the region is higher than fifty kilobits per second and lower than one hundred kilobits per second. A region may be defined as an extremely low speed region when a communication speed in the region is lower than one hundred kilobits per second. In this case, the low speed region and the extremely low speed region, in which the communication speed is lower than one hundred kilobits per second, may be defined as the communication-defective region.

In a region having a low communication speed, a necessary time for transmitting the update data of the target region is long. Thus, the update of the target region may be not finished before the navigation apparatus enters the communication-defective region. Thus, when the communication-defective region is defined to include the region, which has the communication speed lower than the predetermined communication speed, the navigation apparatus receives the update data of the target region including the communication-defective region before entering the communication-defective region.

Further, the target region specify device may specify the target region based on the communication speed of the data communication. For example, as described above, when the communication-defective region is the extremely low speed region, the target region may be specified in such a manner that the communication-defective region is totally included in the target region. Further, when the communication-defective region is the low speed region, the target region may be specified in such a manner that the target region is totally included in the communication-defective region. With this configuration, the number of the target segments included in the target region is reduced. Thus, data amount of the update data of the target region is reduced.

Further, when one of the one or more target segments has a non-latest segment data element that has not undergone a latest update, the update data transmission device may transmit a corresponding update data of the one of the one or more target segments. In this case, the target region specify device may specify the one of the one or more target segments, which has the non-latest segment data element. Alternatively, the update data transmission device may transmit only the corresponding update data of the one of the one or more target segments, which has the non-latest segment data element. With this configuration, data amount of the update data of the target region is reduced.

In a case where the update data of the target region only includes update data of the facility data, newly created road data is not updated by the update data of the target region. Thus, the update data transmission device may transmit update data of the target region when the target region includes a newly created road. In this case, the target region specify device may specify only the target region, which includes the newly created road. Alternatively, the update data transmission device may transmit only the update data of the target region, which include the newly created road. With this configuration, data amount of the update data of the target region is reduced.

When the vehicle is traveling on an expressway, road division guidance is not available at a place other than a junction or an interchange. Thus, the update data transmission device may transmit the update data of the target region when the target region includes roads divided from the route scheduled to go through. In this case, the target region specify device may specify the target region, which has the divided roads. Alternatively, the update data transmission device may transmit the update data of the target region, which has the divided roads. With this configuration, data amount of the update data of the target region is reduced.

Further, the data center may include the communication-defective region acquisition device, the communication-defective region search device, and the target region specify device. Alternatively, the navigation apparatus may include the communication-defective region acquisition device, the communication-defective region search device, and the target region specify device.

Further, the navigation apparatus may be equipped to a vehicle, and the data center may be disposed at a place outside of the vehicle.

According to another aspect of the present disclosure, a navigation apparatus, which configures the navigation apparatus of the navigation system, is provided. According to another aspect of the present disclosure, a data center, which configures the data center of the navigation system, is provided.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A navigation system comprising:
   a navigation apparatus that performs a route guidance, the navigation apparatus storing map data including a plurality of segment data elements, the map data being indicative of a map of an area, each of the plurality of segment data elements being indicative of a corresponding segment included in the area;
   a data center that performs a data communication with the navigation apparatus to transmit update data of a target region, which is included in the area, to the navigation apparatus, the target region including one or more target segments whose segment data elements are to be updated by the update data, the update data of the target region being transmitted per segment data element;
   a communication-defective region acquisition device that acquires information of a communication-defective region, the communication-defective region being included in the area and being defined as a region where the data communication becomes defective;
   a communication-defective region search device that, every time a vehicle travels across two adjacent segments of the area, searches in real time for a part of the communication-defective region as a target communication-defective region, which includes a route scheduled to go through; and
   a target region specify device that, every time the vehicle travels across the two adjacent segments of the area, specifies in real time the target region based on the target communication-defective region, wherein,
   the data center includes an update data transmission device that transmits the update data of the target region to the navigation apparatus before the navigation apparatus enters the target communication-defective region,
   the target region specify device specifies the target region in such a manner that the target region includes the target communication-defective region,
   the communication-defective region search device sets, without depending on a preset guidance route, and based on a travelling direction and a present position of the vehicle, at least a part of a predetermined area, which includes a road ahead in the travelling direction, as the route scheduled to go through, and
   the target region specify device specifies, without depending on a preset guidance route, the target region in such a manner that the target region includes the at least a part of the predetermined area set based on the travelling direction and the present position of the vehicle.

2. The navigation system according to claim 1,
   wherein the communication-defective region acquisition device acquires information of the communication-defective region based on static area map information indicative of the communication-defective region.

3. The navigation system according to claim 2,
   wherein the static area map information indicates a region where the data communication is originally disabled due to a positional relationship between the region and a wireless base station.

4. The navigation system according to claim 1,
   wherein the communication-defective region acquisition device acquires information of the communication-defective region based on dynamic external information indicative of the communication-defective region.

5. The navigation system according to claim 4,
   wherein the dynamic external information indicates a real-time communication status performed by a probe and an infrastructure.

6. The navigation system according to claim 1,
   wherein the communication-defective region is defined as a region, where the data communication is disabled.

7. The navigation system according to claim 1,
   wherein the communication-defective region is defined as a region, where a communication speed of the data communication is lower than a predetermined communication speed.

8. The navigation system according to claim 7,
   wherein the target region specify device specifies the target region based on the communication speed of the data communication.

9. The navigation system according to claim 1,
   wherein, when one of the one or more target segments has a non-latest segment data element that has not undergone a latest update, the update data transmission device transmits a corresponding update data of the one of the one or more target segments.

10. The navigation system according to claim 1,
    wherein the update data transmission device transmits the update data of the target region when the target region includes a newly created road.

11. The navigation system according to claim 1,
    wherein the update data transmission device transmits the update data of the target region when the target region includes roads divided from the route scheduled to go through.

12. The navigation system according to claim 1,
    wherein the data center includes the communication-defective region acquisition device, the communication-defective region search device, and the target region specify device.

13. The navigation system according to claim 1,
    wherein the navigation apparatus includes the communication-defective region acquisition device, the communication-defective region search device, and the target region specify device.

14. The navigation system according to claim 1,
wherein the navigation apparatus is equipped to a vehicle, and the data center is disposed at a place outside of the vehicle.

15. A navigation apparatus, comprising:
a storage that stores map data including a plurality of segment data elements, the map data being indicative of a map of an area and each of the plurality of segment data elements being indicative of a corresponding segment included in the area;
a communication device that receives an update data of a target region included in the area from a data center, the target region including one or more target segments whose segment data elements are to be updated by the update data, the update data of the target region being transmitted by the data center per segment data element; and
a controller that performs a route guidance based in part on the map data,
the data center comprising:
a communication-defective region acquisition device that acquires information of a communication-defective region, the communication-defective region being included in the area and being defined as a region where the data communication becomes defective;
a communication-defective region search device that, every time a vehicle travels across two adjacent segments of the area, searches in real time for a part of the communication-defective region as a target communication-defective region, which includes a route scheduled to go through;
a target region specify device that, every time the vehicle travels across the two adjacent segments of the area, specifies in real time the target region based on the target communication-defective region; and
an update data transmission device that transmits the update data of the target region to the navigation apparatus before the navigation apparatus enters the target communication-defective region, wherein
the target region specify device specifies the target region in such a manner that the target region includes the target communication-defective region,
the communication-defective region search device sets, without depending on a preset guidance route, and based on a traveling direction and a present position of the vehicle, at least a part of a predetermined area, which includes a road ahead in the traveling direction, as the route scheduled to go through, and
the target region specify device specifies, without depending on a preset guidance route, the target region in such a manner that the target region includes the at least a part of the predetermined area set based on the traveling direction and the present position of the vehicle.

16. A data center, which performs a data communication with a navigation apparatus,
the navigation apparatus storing a map data including a plurality of segment data elements, the map data being indicative of a map of an area and each of the plurality of segment data elements being indicative of a corresponding segment included in the area,
the data center transmitting an update data of a target region included in the area to the navigation apparatus, the target region including one or more target segments whose segment data elements are to be updated by the update data and the update data of the target region being transmitted per segment data element, and
the navigation apparatus performing a route guidance based in part on the map data, the data center comprising:
a communication-defective region acquisition device that acquires information of a communication-defective region, the communication-defective region being included in the area and being defined as a region where the data communication becomes defective;
a communication-defective region search device that, every time a vehicle travels across two adjacent segments of the area, searches in real time for a part of the communication-defective region as a target communication-defective region, which includes a route scheduled to go through;
a target region specify device that, every time the vehicle travels across the two adjacent segments of the area, specifies in real time the target region based on the target communication-defective region; and
an update data transmission device that transmits the update data of the target region to the navigation apparatus before the navigation apparatus enters the target communication-defective region, wherein
the target region specify device specifies the target region in such a manner that the target region includes the target communication-defective region,
the communication-defective region search device sets, without depending on a preset guidance route, and based on a traveling direction and a present position of the vehicle, at least a part of a predetermined area, which includes a road ahead in the traveling direction, as the route scheduled to go through, and
the target region specify device specifies, without depending on a preset guidance route, the target region in such a manner that the target region includes the at least a part of the predetermined area set based on the traveling direction and the present position of the vehicle.

* * * * *